(12) United States Patent
Dag

(10) Patent No.: US 12,071,726 B2
(45) Date of Patent: Aug. 27, 2024

(54) BARRIER LAYER FOR CELLULOSE SUBSTRATE

(71) Applicant: PAPACKS SALES GmbH, Cologne (DE)

(72) Inventor: Tahsin Dag, Cologne (DE)

(73) Assignee: PAPACKS SALES GMBH, Cologne (DE)

( * ) Notice: Subject to any disclaimer, the term of this patent is extended or adjusted under 35 U.S.C. 154(b) by 259 days.

(21) Appl. No.: 17/604,822

(22) PCT Filed: Apr. 20, 2020

(86) PCT No.: PCT/EP2020/061009
§ 371 (c)(1),
(2) Date: Oct. 19, 2021

(87) PCT Pub. No.: WO2020/216719
PCT Pub. Date: Oct. 29, 2020

(65) Prior Publication Data
US 2022/0259805 A1 Aug. 18, 2022

(30) Foreign Application Priority Data

Apr. 24, 2019 (DE) .......................... 102019110593.5
Nov. 19, 2019 (DE) .......................... 102019131233.7

(51) Int. Cl.
*D21H 19/34* (2006.01)
*D21H 11/18* (2006.01)
*D21H 19/18* (2006.01)
*D21H 19/82* (2006.01)
*D21H 21/16* (2006.01)
*D21H 27/10* (2006.01)

(52) U.S. Cl.
CPC ............. *D21H 19/34* (2013.01); *D21H 11/18* (2013.01); *D21H 19/18* (2013.01); *D21H 19/824* (2013.01); *D21H 21/16* (2013.01); *D21H 27/10* (2013.01)

(58) Field of Classification Search
CPC ........ D21H 19/34; D21H 11/18; D21H 19/18; D21H 19/824; D21H 21/16; D21H 27/10; D21H 19/50; D21H 19/52; D21H 27/38; B65D 65/466; B65D 85/8043; Y02W 90/10; C09D 191/08
See application file for complete search history.

(56) References Cited

U.S. PATENT DOCUMENTS

| | | | |
|---|---|---|---|
| 1,957,369 A | 5/1934 | Swan | |
| 2,290,633 A | 7/1942 | Cate | |
| 7,241,498 B2 | 7/2007 | Domard et al. | |
| 10,132,043 B2* | 11/2018 | Almkvist | C04B 14/06 |
| 10,988,897 B2* | 4/2021 | Chen | D21H 27/08 |
| 11,326,308 B2* | 5/2022 | Pang | D21H 19/60 |
| 11,555,275 B2* | 1/2023 | Saukkonen | B32B 29/005 |
| 11,598,050 B2* | 3/2023 | Backfolk | D21H 21/16 |
| 11,660,848 B2* | 5/2023 | Knauf | D21H 19/82 428/201 |
| 2004/0185286 A1 | 9/2004 | Propst | |
| 2005/0084677 A1 | 4/2005 | Domard et al. | |
| 2010/0233468 A1 | 9/2010 | Ioelovich et al. | |
| 2010/0316807 A1 | 12/2010 | Propst | |
| 2015/0296852 A1 | 10/2015 | Penhasi et al. | |
| 2017/0305596 A1* | 10/2017 | Dag | B65D 5/0015 |
| 2017/0342661 A1 | 11/2017 | Aulin et al. | |
| 2019/0062998 A1 | 2/2019 | Chen et al. | |
| 2020/0002572 A1* | 1/2020 | Spender | C09D 191/00 |
| 2020/0140138 A1* | 5/2020 | Nykwest | D21H 19/54 |
| 2021/0178458 A1* | 6/2021 | Dooley | B22C 1/2213 |
| 2021/0245485 A1* | 8/2021 | Knauf | D21H 27/10 |
| 2021/0254285 A1* | 8/2021 | Chen | D21H 25/005 |
| 2022/0145541 A1* | 5/2022 | Spender | D21H 17/11 |
| 2022/0259805 A1* | 8/2022 | Dag | D21H 19/50 |
| 2022/0275583 A1* | 9/2022 | Bilodeau | C09D 101/10 |
| 2022/0403203 A1* | 12/2022 | Solovyov | D21H 25/06 |
| 2023/0294893 A1* | 9/2023 | Pagliarulo | B65D 85/70 383/1 |

FOREIGN PATENT DOCUMENTS

| | | | | |
|---|---|---|---|---|
| CA | 3222060 A1 * | 12/2022 | ......... | A45D 40/0068 |
| CN | 101845274 A | 9/2010 | | |
| CN | 102585701 A | 7/2012 | | |
| CN | 104231924 A | 12/2014 | | |
| CN | 107208378 A | 9/2017 | | |
| CN | 108753170 A | 11/2018 | | |
| CN | 109152394 A | 1/2019 | | |
| CN | 117460677 A * | 1/2024 | | |
| CN | 117460678 A * | 1/2024 | ......... | A45D 40/0068 |
| DE | 1 571 138 | 11/1970 | | |
| DE | 601 21 454 T2 | 7/2007 | | |
| DE | 603 13 679 T2 | 1/2008 | | |
| DE | 600 36 110 T2 | 5/2008 | | |
| DE | 10 2017 202 887 A1 | 8/2018 | | |
| DE | 102019131233 A1 * | 10/2020 | | |
| EP | 0 702 703 B1 | 9/1999 | | |
| EP | 1 321 289 B1 | 7/2006 | | |
| EP | 1 327 663 B1 | 5/2007 | | |
| EP | 1 193 545 B1 | 8/2007 | | |
| EP | 2 529 942 B1 | 1/2016 | | |
| EP | 3 444 399 A1 | 2/2019 | | |

(Continued)

OTHER PUBLICATIONS

S. Despond, et al., "Barrier Properties of Paper-Chitosan and Paper-Chitosan-Carnauba Wax Films," Journal of Applied Polymer Science, vol. 98, No. 2, Jan. 1, 2005, pp. 704-710, XP055068110, ISSN: 0021-8995, DOI: 10.1002/app.21754.

(Continued)

*Primary Examiner* — Jose A Fortuna
(74) *Attorney, Agent, or Firm* — NEO IP

(57) ABSTRACT

In a method for the production of coated substrates, a flowable, biologically degradable first coating which enhances gas tightness is applied to a cellulose-containing substrate. To obtain a packaging consisting only of natural components and offering good tightness, a second watertight coating made of animal and/or vegetable waxes and/or lipids is applied to the first coating.

7 Claims, No Drawings

(56) References Cited

FOREIGN PATENT DOCUMENTS

| | | | | |
|---|---|---|---|---|
| ES | 2442261 T3 * | 2/2014 | .......... | B01J 19/1806 |
| ES | 2886103 T3 * | 12/2021 | ............ | C09D 187/00 |
| GB | 1039540 | 8/1966 | | |
| JP | 2005-527710 A | 9/2005 | | |
| JP | 2012-11651 A | 1/2012 | | |
| JP | 2015-227517 A | 12/2015 | | |
| JP | 7249016 B2 * | 3/2023 | .............. | A23L 3/015 |
| WO | WO 2007/088974 A1 | 8/2007 | | |
| WO | WO 2011/088966 A1 | 7/2011 | | |
| WO | WO 2013/014493 A1 | 1/2013 | | |
| WO | WO 2017/072124 A1 | 5/2017 | | |
| WO | WO 2017/144009 A1 | 8/2017 | | |
| WO | WO-2017144009 A1 * | 8/2017 | .............. | A23L 3/015 |
| WO | WO-2020056124 A1 * | 3/2020 | .............. | B65D 3/04 |
| WO | WO 2020/087079 A1 | 4/2020 | | |
| WO | WO-2022258697 A1 * | 12/2022 | | |
| WO | WO-2022266329 A2 * | 12/2022 | ........... | C09D 129/06 |
| WO | WO-2023168316 A1 * | 9/2023 | ............... | A61K 9/00 |

OTHER PUBLICATIONS

Aristippos Gennadios, "Protein-Based Films and Coatings," Boca Raton 2002.

Mikael Gällstedt et al., "Packagin-related properties of protein- and chitosan-coated paper," Packaging Technology and Science 18(4), Apr. 2005:161-170.

Khaoula Khwaldia et al., "Biopolymer Coatings on Paper Packaging Materials," Comprehensive Reviews in Food Science and Food Safety, vol. 9 (2010), 82-91.

Office Action mailed Nov. 14, 2023 for Japanese Patent Application No. 2021-562156 and English Translation of Office Action (entire document).

* cited by examiner

BARRIER LAYER FOR CELLULOSE SUBSTRATE

TECHNICAL FIELD

The system described herein relates to a method for the production of coated substrates, in which a flowable and biodegradable first coating increasing the gas-tightness is applied to a cellulose-containing substrate.

BACKGROUND OF THE INVENTION

Packaging made from cellulose, in particular, those made from molded pulp, cardboard, and paper, are enjoying increasing popularity. Cellulose fibers are a frequently-used material that is extremely easy to recycle. Recycled raw materials (wood, paper, etc.) are also ideal for the production of cellulose packaging. The cellulose is processed, for example, in the pulp molding process. An aqueous pulp with cellulose fibers is produced from which the fibers are shaped. Using a simple scooping process, the water can be sucked through a suction mold, with the cellulose fibers being deposited on the porous surface of the suction mold. In the transfer process, the molded body formed by the suction mold is transferred to a transfer mold so that the molded body is shaped from both sides. Additional thermal processing methods and pressing methods can be used, which increase the surface quality of the molded body. Alternatively, the cellulose can be processed into paper or cardboard and used as a packaging material.

It is known from the prior art to render cellulose-containing substrates essentially gas-tight by means of a coating. For this purpose, the substrates can be coated with cellulose fibers, in particular microfibrils and/or nanofibrils made of cellulose, for example.

Such coating methods are known from the publications EP 3 444 399 A1, JP 2015 227517 A, JP 2012 011651 A, WO 2017/144009A1, EP2529942B1 and WO 2017/072124 A1. The substrates coated with cellulose fibrils are additionally coated with polymers such as polyethylene or polypropylene, but also with biodegradable polymers such as polylactic acid or polyvinyl alcohol.

DESCRIPTION OF VARIOUS EMBODIMENTS

The system described herein provides a largely gas- and watertight packaging for packaging food which is primarily made from natural raw materials.

According to the system described herein, a second waterproof coating, composed predominantly of animal and/or vegetable waxes, and/or lipids, is applied to a first coating.

The second coating can contain, for example, at least 90% by weight, animal and/or vegetable waxes and/or lipids. The second coating can contain at least 70%, by weight, animal and/or vegetable waxes.

The first coating and/or the second coating can be applied by spraying.

In other words, the sealing layer applied to the cellulose substrate can be made resistant to water and moisture by applying a layer of natural waxes and/or oils or fats. Natural waxes and/or lipids mainly consist of esters of fatty acids and, as oil-soluble products, are readily biodegradable according to the test method CEC-L-33-A-93. The entire coated packaging consequently consists mainly of cellulose fibers, possibly other natural components and natural lipids or waxes, and can therefore be disposed of in an environmentally friendly manner, but the coated packaging can also be recycled.

In practice, the second coating can contain at least one of the following components:
linseed oil,
carnauba wax, and/or
beeswax.

Linseed oil is used to improve the malleability of the oil-wax mixture, which forms the second coating, and to minimize the brittleness after drying. Pharmaceutical, i.e. completely clarified, pure linseed oil can be used. Linseed oil is one of the few hardening oils and has been used to impregnate wood for centuries. A layer of linseed oil alone is open-pored, which means that some water and air can pass through, and is not suitable for permanently sealed food packaging.

Carnauba wax is a very hard, tropical wax with a high melting temperature (approx. 85-89° C.). Carnauba wax has hardly any smell or taste of its own and is waterproof. Carnauba wax is very brittle when dry and hardens within seconds. Due to its hardness, Carnauba wax is also very resistant to abrasion. Carnauba wax is approved for the packaging of food and has long been used as a coating to increase the shelf life of e.g. mangos, sweets, etc.

Beeswax is a wax produced in Europe, among other places, that is less hard than carnauba wax. When mixed with carnauba wax, beeswax helps reduce brittleness. Beeswax has hardly any inherent odor or taste and is also approved for use in connection with food. The melting point of Beeswax is around 65° C.

In particular, the second coating can contain the following components:
20 to 30% by weight linseed oil,
40 to 60% by weight of carnauba wax and
30 to 40% by weight beeswax.

This mixture has the positive properties of the three components, i.e. high impermeability and abrasion resistance, a neutral smell or taste, and high flexibility at ambient temperature. The coating properties of this mixture in combination with the underlying layer of cellulose microfibrils or cellulose nanofibrils is very well suited to meet the requirements for water resistance and gas tightness that are required for food packaging.

In practice, the flowable first coating solution, for producing the first coat, can have cellulose nanofibrils or microfibrils dissolved in water. Nanocellulose has cellulose microfibrils with a median diameter in a range from 30 to 100 nm and/or cellulose nanofibrils with a median diameter in a range from 5 to 20 nm. Industrially distributed cellulose fibrils are often a mixture of microfibrils and nanofibrils. In practice, a mixture of 2% by weight of nanocellulose in 98% by weight of water has proven useful for the first coating. If a higher cellulose content is selected, deformation of the fiber-containing substrate due to moisture can be reduced or avoided and the drying time shortened. In practice, a cellulose content of 2 to 10% by weight of the first coating solution is suitable.

However, there are other organic materials which, in a coating, increase the impermeability of a cellulose substrate to the penetration of gas. For example, casein powder can be mixed with water and denatured with calcium hydroxide. The casein increases the impermeability and mechanical strength of the substrate. Casein denatured with calcium hydroxide also becomes water repellent to some extent. It is also possible to denature the casein with baking soda, but this does not make the casein water-repellent. A coating with casein is particularly suitable for dairy products, the manufacture of which may produce casein. The strength-increasing effect of the casein coating enables the substrate to be used, for example, as a substitute for plastic, for example in the manufacture of disposable cutlery. Disposable cutlery can also be made from cellulose-coated substrates with a waterproof second layer. However, a casein coating can significantly increase the strength, which is important, for example, when the substrate is used to form a knife.

In practice, 30 g of casein powder were left to soak with 100 ml of water for about 8 to 10 hours, 30 g of calcium hydroxide were added and stirred. After another 50 ml of water had been added, the solution was sieved and used for coating. This coating can be applied after coating with cellulose fibers or as an alternative to coating with cellulose fibers. The first coating can also contain both cellulose fibers and casein.

Whey is also suitable as a component of the first coating. Whey can be denatured by heat (90°-100° C.). Whey as part of the first coating also increases the strength of the coated substrate. The whey coating itself is not water-repellent and must therefore be made waterproof with the second coating.

Finally, gel-forming components such as agar-agar (gelatin from algae) or psyllium husks (seed husks of the plantain species *Plantago indica, Plantago afra*) are suitable for adding to the first coating. For this purpose, agar-agar powder is mixed with water and denatured for 1 min at 100° C. When the mixture cools, it hardens and gels. The gel can be applied to the substrate and forms a thin layer that closes the pores of the substrate, increasing the strength of the substrate and causing the substrate to repel water.

A similar effect is achieved when ground psyllium husks are soaked in water and applied to the substrate after swelling for about 20 minutes.

As mentioned, the components of the first coating can be dissolved in water and applied at the same time. However, it is also possible to apply various components of the first, non-waterproof coating to the substrate in several application processes.

The first coating can first be dried before the second coating of natural waxes and lipids is applied. The water-containing first coating will not mix with the second coating of oil and wax, so that complete drying is desirable before the second coating is applied.

As mentioned at the beginning, the substrate itself is formed from cellulose fibers. In particular, the substrate can be produced as a thin-walled product using the pulp molding process with or without subsequent pressing or thermal molding.

The substrate can have many different shapes, such as the shape of:
a cup;
a pot;
a container;
a knife;
a fork;
a spoon;
a plate.

The substrate can serve as food packaging or as disposable crockery or cutlery. Particularly when used as disposable cutlery, the increased strength that can be achieved by the various components of the first coating is of considerable importance.

Further, the production of a capsule may be envisaged into which a powder for preparing beverages, in particular ground coffee, is filled. Individually-packaged single-serve containers for coffee are enjoying increasing popularity. Various packaging techniques are used for this. Pure aluminum packaging offers a high level of tightness and enables the coffee packaged in it to be stored for a long time. However, it also requires a lot of energy and high material costs in the manufacture of the packaging and leads to considerable amounts of waste. So-called coffee pods are portions of coffee wrapped in cellulose fleece. This packaging weighs less and is more easily biodegradable than aluminum packaging. However, the pads lack tightness, so that the coffee packaged in the pods cannot be stored for as long or loses its aroma.

A single-serve coffee container made of a capsule consisting of the substrate described here has a high degree of tightness, which is much higher than that of a pad made of uncoated cellulose fiber. As a result, it is possible to keep the coffee much longer. The capsule can be sealed with a cover layer consisting, for example, of a paper layer with the coating described above. The capsule consists solely of natural raw materials, namely cellulose and natural waxes and lipids, and can be easily disposed of or recycled.

To produce the capsule, a tray, that is to say a single-layer body with several depressions, can first be produced using the pulp molding process. The tray and the depressions are first sprayed with the suspension with nanocellulose. After this first coating has dried, the mixture of waxes and oils, in particular, 25% by weight of linseed oil, 50% by weight carnauba wax, and 25% by weight beeswax, is applied as the second coating. The second coating can be sprayed or the substrate with the first coating can be dipped into the mixture, the wax/oil mixture then penetrating deep into the pores of the cellulose substrate with the first coating by heating and being evenly distributed. In this way, the tightness of the end product is increased.

The tray can also be re-pressed after the first coating has been sprayed on, in particular by means of a heated mold. This speeds up the drying process.

The waxes and lipids of the second coating are heated for application, e.g. to a temperature of 90° C., in order to remain in the liquid state. The heated reservoir for the material of the second coating can be arranged in the immediate vicinity of a drying channel for the first coating. The nozzles for applying the second coating can also be heated. The second coating cools down in a short time (a few seconds) and hardens in the process. The food packaging can then be used.

The capsules, which are formed by the depressions in the tray, are then filled with the intended amount of coffee and then closed with a seal. The seal can consist of a paper layer, which is also provided with a first coating of nanocellulose and a second coating of animal and/or vegetable waxes and/or lipids, so that it is gas-tight and water-resistant.

Sealing takes place using a tool that is precisely tailored to the shape of the tray and that seals between the troughs filled with coffee on the molded pulp webs of the tray. The tool has approx. 5 mm wide metal webs that can be placed on the webs between the depressions of the tray. The tool can be heated and pressed onto the tray with pressure, if necessary in a counter-mold. The counter-mold makes it possible to apply the necessary pressure to the webs of the tray and holds the tray exactly in place in order to be able to carry out the sealing.

After sealing, the tray can be cut into individual capsules. However, it is also possible to cut larger sections with several capsules, which can then be separated either with scissors or by separating along a perforation line that runs in a sealed web between two hollows of the tray.

It can be seen, however, that the coated substrate is also suitable for the packaging of other objects, in particular foodstuffs which have to be packaged in a largely gas-tight manner in order to preserve freshness. In particular, dried foods such as seasoning mixes or powders for mixing soups can be packaged in a beaker with such a coating. Substrates coated in this way can also be used as dinner plates or drinking cups, where the dinner plates or drinking cups come into brief contact with water.

The invention claimed is:

1. A method for the production of coated substrates, comprising:
    molding a three dimensional cellulose-containing substrate using a pulp molding process;
    preparing a flowable and biodegradable first coating comprising cellulose and denatured casein, wherein the denatured casein is obtained by reacting casein with a denaturing agent, wherein the denaturing agent is calcium hydroxide, wherein the denatured casein is water-repellent, wherein the cellulose and the denatured casein are dissolved in water;
    applying the flowable and biodegradable first coating increasing gas-tightness to the cellulose-containing substrate;
    solidifying and drying the first coating; and
    applying a second waterproof coating comprising an oil and/or wax composition, wherein the oil and/or wax composition comprises animal and/or vegetable waxes, and/or lipids, to the first coating.

2. The method according to claim 1, wherein the second coating contains at least one component selected from the group consisting of:
    linseed oil,
    carnauba wax, and
    beeswax.

3. The method according to claim 2, wherein the second coating contains:
    20 to 30% by weight linseed oil,
    40 to 60% by weight carnauba wax and
    30 to 40% by weight beeswax.

4. The method according to claim 1, wherein the flowable first coating further comprises at least one-component selected from the group consisting of:
    whey;
    agar-agar; and
    psyllium husks.

5. The method according to claim 1, wherein the cellulose of the first coating comprises cellulose microfibrils with a median diameter in a range from 30 to 100 nm and/or cellulose nanofibrils with a median diameter in a range from 5 to 20 nm.

6. The method according to claim 1, wherein the cellulose of the first coating and the denatured casein of the first coating are applied in one or more application processes.

7. The method according to claim 6, wherein the cellulose of the first coating is applied in a first application process and the denatured casein of the first coating is applied in a second application process.

* * * * *